Patented Sept. 8, 1953

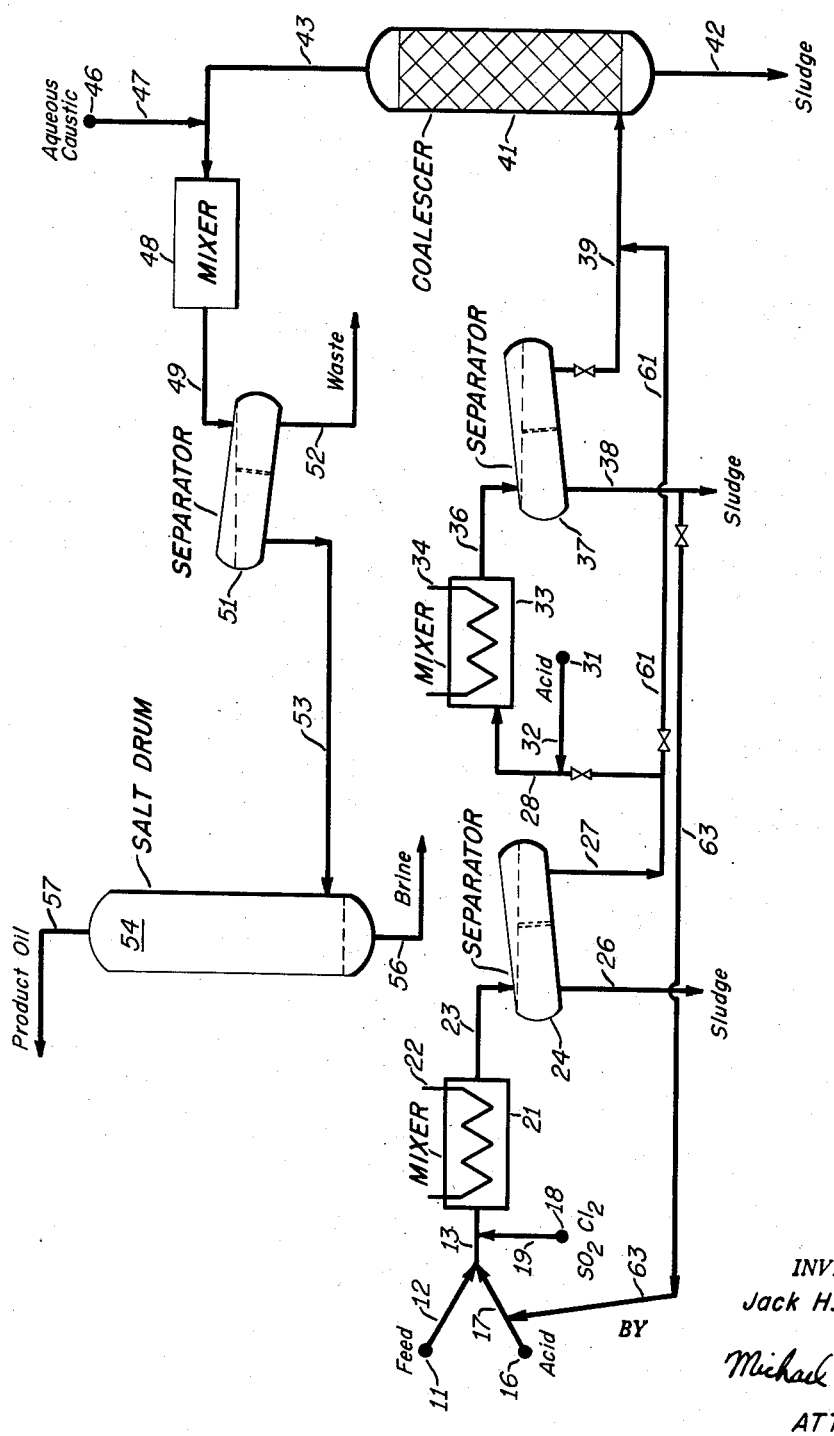

2,651,596

UNITED STATES PATENT OFFICE 2,651,596

REFINING OF DISTILLATES WITH SULFURIC ACID AND $SO_2Cl_2$

Jack H. Krause, Hammond, Ind., assignor to Standard Oil Company, Chicago, Ill., a corporation of Indiana Application April 4, 1952, Serial No. 280,683

17 Claims. (Cl. 196—31)

This invention relates to the refining of virgin petroleum distillates which contain objectionable amounts of mercaptans. More particularly, it relates to the treatment of distillates in the heavier-than-gasoline boiling range to produce a substantially sweet oil having good color stability.

It has been customary for many years to either remove or convert the mercaptans contained in naphthas in order to produce a product of inoffensive odor. In recent years the trend in the industry has moved in the direction of producing substantially sweet oils for use in diesel motors and for use in domestic heating installations. The petroleum distillates used for burning oils, diesel oils, heater oils and heavy kerosenes are much more difficult to sweeten than are naphthas. This is particularly true when the raw distillate is derived from a high sulfur crude such as West Texas crude or California crudes. Many methods are known for sweetening these high mercaptan number distillates such as doctor sweetening and sulfuric acid treating. It has been found that a virgin distillate which contains objectionable amounts of mercaptans is extremely difficult to sweeten without seriously affecting the color stability of the product oil. This defect is particularly true of the sulfuric acid treating technique.

It is an object of this invention to treat virgin petroleum distillates which contain objectionable amounts of mercaptans to produce a substantially sweet product oil having good color stability. Another object of this invention is to improve the conventional sulfuric acid method for sweetening virgin petroleum distillates boiling in the heavier-than-gasoline range. Still another object of this invention is to sweeten sour virgin petroleum distillates to obtain a product which is substantially sweet, of good color stability, of improved odor and having a reduced deposit-forming property.

The above objects and other objects which have not been specifically mentioned are attained by treating a virgin petroleum distillate which contains objectionable amounts of mercaptans, i. e., a sour distillate, with sulfuric acid and sulfuryl chloride, separating the treated oil from the acid sludge formed in the treatment and removing residual acid and acid sludge from the treated oil, e. g., by means of an aqueous caustic wash. A substantially sweet oil of still further improved color stability can be obtained by a two-stage treatment which comprises (1) contacting the sour distillate with sulfuryl chloride and an amount of sulfuric acid, separating the treated oil from the acid sludge and (2) contacting the treated oil with an amount of sulfuric acid and separating an oil from the acid sludge formed and then removing the residual acid and acid sludge from the oil. An oil of satisfactory color stability can be obtained by treating the sour distillate with sulfuryl chloride and acid sludge derived from preferably the treating of a similar type of sour distillate; or more desirably, a two-stage treatment wherein the sour distillate is contacted with acid sludge and sulfuryl chloride in a first step, and the treated oil is contacted in a second step with sulfuric acid and the sludge formed in the second step is used in the first step.

It has been found that an aqueous sulfuric acid solution should be used in this process, which aqueous solution contains between about 85 and 100 weight percent of sulfuric acid, i. e., as 100% acid. Preferably the sulfuric acid solution should contain between about 93 and 100% of the acid. The sulfuric acid solution may be the so-called white acid, i. e., fresh acid or it may be the so-called black acid, i. e., sulfuric acid which has been derived by the regeneration of acid sludge and/or from acid derived from the treatment of hydrocarbons. The black color results from the presence of oxidized organic material in the acid. When using black acid the concentration should be on the basis of the effective strength of the acid rather than on a total solution basis.

The amount of acid used in the process will vary somewhat with the mercaptan content of the sour distillate undergoing treatment, with the strength of the acid solution which is being used and with the amount of $SO_2Cl_2$ being used. In general the amount of acid used, in a one-step process, will be between about 2 lbs. and 20 lbs. per barrel of sour distillate being treated; it is preferred to use between about 4 and 10 lbs./bbl. Hereinafter, lbs./bbl. is intended to mean pounds per barrel of distillate being treated. It has been found that a product oil of better color stability can be produced by a two-step process wherein all the $SO_2Cl_2$ and a portion of the sulfuric acid is utilized in contacting the raw distillate in the first step and the remainder of the acid is used in the second step in contacting the treated oil from the first step. It is preferred that when operating with this two-step procedure that between about 2 and 10 lbs./bbl. of acid are used in the first step and in the second step between about 2 and 10 lbs./bbl. of acid are used; the acid usage in the second step is based on raw distillate to the process. When operating on a two-step process using $SO_2Cl_2$ and acid sludge in the first step, it is preferred to use between about 4 and 10 lbs./bbl. of acid in the second step.

Sulfuryl chloride—$SO_2Cl_2$—is a liquid having a specific gravity of 1.667, a melting point of about $-65°$ F. and a boiling point of about $156°$ F.; it is readily decomposed by cold water and is quite soluble in acid. It has been found that very slight amounts of $SO_2Cl_2$ present during the acid treatment of a virgin distillate will markedly improve the degree of mercaptan removal from the product oil. It is desirable to limit the amount of $SO_2Cl_2$ as chlorinated compounds are formed which are oil soluble when excessive amounts of $SO_2Cl_2$ are present in the process. The amount of $SO_2Cl_2$ used is related to the amount of sulfuric acid being used; the more sulfuric acid used in the process, the smaller the amount of $SO_2Cl_2$ that is needed—however, some $SO_2Cl_2$ is necessary in all cases. The amount of $SO_2Cl_2$ used should be between about 0.05 and 1 weight percent based on the sour distillate charged to the process. When using between about 4 and 10 lbs./bbl. of sulfuric acid, it is preferred to use between about 0.2 and 0.5 weight percent of $SO_2Cl_2$ wherein the smaller $SO_2Cl_2$ usage is related to the larger acid usage. Hereinafter, the phrase "weight percent of $SO_2Cl_2$" is intended to mean weight percent based on sour distillate charged to the process. The $SO_2Cl_2$ is generally added to the mixture of sulfuric acid and sour distillate. However, it may be added to the sulfuric acid before contacting the sour distillate.

The temperature at which the treating is carried out has a bearing on the contacting time necessary and the color of the product oil. It has been found that the temperature of treating should be maintained at less than about $125°$ F. in order to prevent color degradation. In order to have a reasonably rapid contacting time, the temperature of treating should be maintained above about $50°$ F. In general it is preferred to treat at a temperature between about $80°$ and $100°$ F. These temperature ranges apply not only to the treatment with sulfuric acid or acid usage and $SO_2Cl_2$, but also to the subsequent treatment with sulfuric acid alone.

The contacting time needed to obtain a substantially sweet product oil of good color stability is dependent upon the temperature at which the contacting is carried out and also the concentration of the sulfuric acid used and the amount of sulfuric acid and $SO_2Cl_2$ used. In general it has been found that a suitable contacting time will be between about 2 minutes and 60 minutes, the less contacting times corresponding roughly to higher temperature of contacting. When operating within the preferred temperature range, the contacting time should be between about 5 and 30 minutes.

The invention is described in more detail in connection with the figure, which figure represents a preferred embodiment of the process of this invention. It is to be understood that this embodiment even though preferred, is illustrative only and is not intended to limit the scope of the invention. Numerous items of process equipment have been omitted from the figure as these can readily be added thereto by those skilled in the art.

The feed stock to the process is a virgin petroleum distillate having an objectionable amount of mercaptans present therein. It has been found that a preferred feed stock is a sour virgin distillate boiling in the heavier-than-gasoline range, i. e., between about $325°$ and $600°$ F. However, distillates having an ASTM end point as high as about $700°$ F. can be treated by this process. While generally it is not necessary to utilize as drastic a treatment as that involved in this process for the sweetening of straight run naphthas, it has been found that this process is extremely effective in sweetening very sour heavy naphthas, which naphthas contain a substantial amount of material boiling above about $300°$ F. The process of this invention is extremely effective on virgin distillates obtained from sour crudes such as West Texas crude and most California crudes. Sour distillates from these crudes frequently have mercaptan numbers between about 40 and 100. The feed stock to this illustration is a West Texas sour virgin distillate boiling between about $300°$ F. and $600°$ F. and having a mercaptan number of about 85; the feed from source 11 is passed through line 12 into line 13.

The sulfuric acid used in the process is passed from source 16 through line 17 into line 13. In this illustration about 3 lbs./bbl. of 95% sulfuric acid is passed into line 13. The feed from line 12 and the acid from line 17 enter into line 13 by way of a Y connection, which causes the streams to impinge on each other and gives a certain amount of intermingling prior to meeting the $SO_2Cl_2$ stream. $SO_2Cl_2$ from source 18 is passed through line 19 into line 13 where it meets the combined feed and acid streams. In this illustration 0.3 weight percent of $SO_2Cl_2$ based on feed is introduced into the contacting zone.

The combined streams are passed from line 13 into mixer 21 where they are thoroughly intermingled and maintained in contact with each other for about 10 minutes. Mixer 21 is provided with a heating coil 22 which permits the contacting zone to be maintained at the desired temperature of treating, in this instance about $90°$ F. From mixer 21 the treated oil, reaction products and residual acid are passed by way of line 23 into separator 24.

In separator 24 the acid sludge settles to the bottom of the separator and is withdrawn by way of line 26. This acid sludge may be disposed of by any of the conventional sludge disposal methods; preferably it is sent to a sulfuric acid recovery system. The treated oil in separator 24 contains some residual acid occluded therein and a small amount of acid sludge suspended therein. The acid sludge in the treated oil is commonly referred to as pepper sludge. The treated oil along with residual acid and acid sludge is withdrawn from separator 24 by way of line 27 and is passed into valved line 28.

Sulfuric acid from source 31 is passed through line 32 into line 28 where it meets the treated oil from line 27. In this instance about 3 lbs./bbl. of feed of 95% sulfuric acid is introduced into line 28. The combined streams in line 28 are passed into mixer 33 which is provided with heating coils 34. The treated oil and acid are maintained in intimate contact in mixer 33 for about 10 minutes at a temperature of about $90°$ F. The oil and acid sludge are passed from mixer 33 by way of line 36 into separator 37.

The lower layer of acid sludge is withdrawn from separator 37 by way of line 38. The acid sludge may be disposed of in a manner similar to that used for disposing of the sludge from the first treating zone. The oil and occluded residual acid and acid sludge is withdrawn from separator 37 and is passed by way of valved line 39 into coalescer 41.

Coalescer 41 is a vertical cylindrical drum containing a bed of coalescing material, such as steel wool, sand, crushed gravel, Raschig rings, etc.; in this instance coalescer 41 is packed with steel wool. The residual acid and pepper sludge are agglomerated by the steel wool and drain down through the bed of steel wool and are withdrawn from coalescer 41 through line 42. The oil now substantially free of occluded acid and pepper sludge, but still containing some acidic material, is passed from coalescer 41 into line 43.

An aqueous caustic solution from source 46 is passed through line 47 into line 43. The aqueous caustic may be any alkali metal hydroxide and may be of substantially any concentration as long as sufficient caustic is present to neutralize the acidic materials in the oil in line 43. In this illustration a 10% sodium hydroxide solution in an amount about 50 volume percent based on oil in line 43 is used. The caustic-oil contents of line 43 are passed into mixer 48 where they are thoroughly intermingled for about 5 minutes. From mixer 48 the caustic-oil mixture is passed by way of line 49 into separator 51.

The heavier layer of aqueous caustic solution and reaction products is withdrawn from separator 51 and sent to waste disposal by way of line 52. The neutralized oil is withdrawn from separator 51 and is passed through line 53 into salt drum 54.

Salt drum 54 is a vertical cylindrical drum containing a bed of crushed rock salt. The neutralized oil contains water in solution and also in suspension which render the oil "hazy." The salt in drum 54 removes the suspended water and most of the dissolved water; this water is withdrawn from drum 54 in the form of a brine by way of line 56. From the top of salt drum 54 there is withdrawn by way of line 57 a bright product oil which is substantially mercaptan free and of excellent color stability.

In the above embodiment a two-stage treating process has been shown. In some cases the feed will be of relatively low mercaptan number and have an inherently good color stability such that the improvement in color stability obtainable by a two-step process is not necessary. In such a case the second acid treating step may be bypassed and the treated oil from separator 24 may be passed through line 27 and valved line 61 into valved line 39 and thence into coalescer 41. The remainder of the process will then be the same as for the described two-step process. However, when using the one-step process, it may be desirable to use an amount of acid which is at least equal to but preferably slightly in excess of that used in the two stages of the two-step process.

In some cases when it is desirable to minimize the amount of acid usage, the refiner may be willing to accept an oil of inferior color stability, such as obtained when acid sludge is used along with SO₂Cl₂ instead of sulfuric acid. It is preferred that a two-step process be used in such a case wherein sulfuric acid is used in the second step. When charging a feed stock in this manner the process described in the figure will be operated in the selfsame manner except that acid sludge from separator 37 and line 38 will be cycled to line 17 by way of valved line 63. Of course no acid from source 16 will be introduced into line 17. When using acid sludge in the first stage of treating, it is preferred that more acid be present in mixer 33 than would be present therein in a two-stage acid treating process.

In order to show the results obtainable by this process, certain illustrative experimental data are presented. These data were obtained by treating 300 ml. of sour heater oil with various amounts of black acid which had an effective sulfuric acid content of 98 weight percent, the remainder being substantially water—trace amounts of carbonaceous material were also present. The heater oil and the acid were added to a beaker maintained at about 90° F. and agitated vigorously for about 10 minutes. The treated oil was decanted from the acid sludge and neutralized with a 5% sodium hydroxide solution. The neutralized oil was then water washed to remove occluded caustic solution. The rich feed oil in all the experimental runs was obtained by distillation of a sour West Texas crude. The physical characteristics of the sour heater oil are given below. Except where indicated, colors were determined by the Saybolt method. The aged color was determined as follows: 100 ml. of oil were placed in a 250 ml. beaker and the oil maintained at a temperature of 200° F. for 20 hours. A sample of the aged oil was withdrawn and the aged Saybolt color obtained. In all runs the amount of acid added was calculated as pounds of acid per barrel of feed oil and the amount of $SO_2Cl_2$ used was calculated as weight percent based on feed oil.

| | |
|---|---|
| API gravity | 40.3 |
| Mercaptan No. | 70 |
| Color, Saybolt: | |
|   Original | +21 |
|   Aged | +12 |
| ASTM distillation: | |
|   IBP °F | 330 |
|   10% | 390 |
|   50% | 450 |
|   90% | 500 |
|   Max | 550 |

*Table I*

| Run | Acid (Lbs./Bbl.) | SO₂Cl₂ (Wt. Percent) | Product Oil | | | |
|---|---|---|---|---|---|---|
| | | | Mercaptan No. | Original Color | Aged Color | Cl₂ Content, Wt. Percent |
| 1 | 48 | None | 4.5 | 29 | 28 | None. |
| 2 | 8 | do | 19.9 | 24 | 22 | Do. |
| 3 | 8 | 0.14 | 3.8 | 27 | 24 | 0.01. |
| 4 | 8 | .21 | 1.2 | 27 | 20 | .01 |
| 5 | 8 | .28 | Sweet | 27 | 18 | .02. |
| 6 | 4.8 | .28 | do | 27 | 22 | .02. |
| 7 | 2.4 | .28 | 3.5 | 25 | 12 | .02. |

For purposes of comparison several runs were made using free chlorine in conjunction with sulfuric acid for the treating of the above described sour heater oil. In order to obtain some idea as to the amount of chlorination of the product oil, the product oil was analyzed for chlorine content; these results are presented as Cl₂ Content, weight percent. The data on the treatment with sulfuric acid and free chlorine are shown below:

Table II

| Run | Acid (Lbs./Bbl.) | Free Cl₂ (Wt. Percent) | Product Oil ||||
|---|---|---|---|---|---|---|
| | | | Mercaptan No. | Original Color | Aged Color | Cl₂ Content, Wt. Percent |
| 8 | 48 | 0.12 | Sweet | 29 | 22 | 0.04 |
| 9 | 8 | .09 | 5.8 | 21 | 0 | .05 |
| 10 | 8 | .21 | Sweet | -4 | 2 ASTM | .24 |

It is to be noted that in order to obtain both a sweet product and a color stable product, it was necessary to use an enormous amount of acid along with the free chlorine. When using a commercially feasible amount of acid and free chlorine, a sweet product oil had a completely unsatisfactory color stability.

In order to show the effects of a two-step treatment, a run was carried out in which the above described sour distillate was contacted for 10 minutes at about 90° F. with the equivalent of 4 lbs./bbl. of black 98% acid and $SO_2Cl_2$ in an amount of 0.21 weight percent based on oil in the first stage; the treated oil from the first stage was then contacted under about the same conditions with 4 lbs. of black 98% acid. The oil from the second stage was then neutralized and washed in the usual manner. In Table III are presented data on two-stage runs using 4 lbs./bbl. of acid in the first stage and 4 lbs./bbl. in the second stage with different levels of $SO_2Cl_2$ in the first stage.

Table III

| Run | Acid (Lbs./Bbl.) | SO₂Cl₂ (Wt. Percent) | Product Oil ||||
|---|---|---|---|---|---|---|
| | | | Mercaptan No. | Original Color | Aged Color | Cl₂ Content, Wt. Percent |
| 11 | 4.4 | 0.21 | 1 | 30 | 29 | 0.01 |
| 12 | 4.4 | .28 | Sweet | 30 | 29 | .02 |

It is apparent that the chief advantage of a two-stage treatment is the production of an oil of greatly improved aged color; the oils in the above runs were essentially water-white.

Thus having described the invention, what is claimed is:

1. A process for refining a mercaptan-containing virgin hydrocarbon distillate which comprises contacting said distillate with an effective amount of sulfuric acid in the presence of an effective amount of sulfuryl chloride, separating treated oil from the acid sludge formed in said contacting, and removing residual acid and acid sludge from said treated oil.

2. The process of claim 1 wherein said sulfuric acid consists essentially of an aqueous solution containing between about 85 and 100 weight percent sulfuric acid, and the amount of said sulfuric acid used is between about 2 and 20 lbs. per bbl. of said distillate.

3. The process of claim 2 wherein the amount of sulfuryl chloride used is between about 0.05 and 1 weight percent, based on said distillate.

4. A process for reducing the mercaptan content and improving the color stability of a sour virgin petroleum distillate, which process comprises contacting, at a temperature between about 60° and 125° F., said distillate with between about 2 and 20 lbs. per bbl. of distillate of an aqueous solution containing between about 85 and 100 weight percent of sulfuric acid, in the presence of between about 0.05 and 1 weight percent, based on said distillate, of sulfuryl chloride, continuing said contacting for a time sufficient to substantially reduce the mercaptan content of said distillate, separating treated oil from the acid sludge formed in said contacting, and removing residual acid and acid sludge from said treated oil.

5. The process of claim 4 wherein said aqueous solution is used in an amount between about 4 and 10 lbs./bbl. of said distillate and the amount of sulfuryl chloride used is between about 0.2 and 0.5 weight percent based on said distillate and the amount of solution used is decreased as the sulfuryl chloride usage is increased.

6. The process of claim 4 wherein said distillate is a heater oil distillate.

7. A method for producing a substantially sweet oil of improved odor and color stability from a sour virgin petroleum distillate boiling within the range between about 325° and 600° F., which method comprises treating said distillate at a temperature between about 80° and 100° F. with between about 4 and 10 lbs./bbl. of said distillate of aqueous sulfuric acid, having a concentration of between about 93 and 100%, and with between about 0.2 and 0.5 weight percent, based on said distillate, of sulfuryl chloride, wherein the smaller sulfuryl chloride usage is related to the larger acid usage, for a time sufficient to substantially sweeten said distillate, separating the treated oil from the acid sludge formed in said treating, and removing the residual acid and acid sludge from said treated oil.

8. The method of claim 7 wherein said treating time is between about 5 and 30 minutes.

9. The method of claim 7 wherein said treated oil is contacted with aqueous caustic in an amount effective to remove residual acid and acid sludge from said treated oil, and separating a substantially sweet oil of good color stability from an aqueous caustic phase.

10. The method of claim 7 wherein said sulfuryl chloride is introduced into a mixture of said distillate and said acid.

11. A process for reducing the mercaptan content and improving the color stability of a sour, virgin petroleum distillate, which process comprises (1) contacting, at a temperature between about 60° and 125° F., said distillate with between about 2 and 10 lbs./bbl. of said distillate, of an aqueous sulfuric acid having an acid strength between about 85 and 100 weight percent, and with between about 0.05 and 1 weight percent, based on said distillate, of sulfuryl chloride, for a time between about 2 and 60 minutes, (2) separating treated oil from the acid sludge formed in said contacting, (3) contacting said treated oil, at a temperature between about 60° and 125° F., with, between about 2 and 10 lbs./bbl. of said distillate, of an aqueous sulfuric acid of a strength between about 85 and 100 weight percent, for a time sufficient to obtain a substantial reduction in mercaptan content of said distillate, (4) separating an oil from the acid sludge formed in step (3), and (5) treating said oil from step (4) to remove therefrom residual acid and acid sludge.

12. The process of claim 11 wherein the amount of sulfuryl chloride used in step (1) is between 0.2 and 0.5 weight percent and said amount is related to the acid usage in said step (1) in such a manner that the lesser sulfuryl chloride usage corresponds to the higher acid usage.

13. The process of claim 11 wherein the temperature of contacting in steps (1) and (3) is between about 80° and 100° F.

14. The process of claim 11 wherein said sulfuryl chloride is introduced into a mixture of said distillate and said acid.

15. The process of claim 11 wherein said distillate is a heater oil distillate.

16. A process for improving the mercaptan number and the color stability of a sour virgin petroleum distillate, which process comprises (1) contacting said distillate, at a temperature between about 80° and 100° F., with acid sludge and with sulfuryl chloride, in an amount between about 0.2 and 0.5 weight percent based on said distillate, for a time between about 5 and 30 minutes, (2) separating treated oil from acid sludge and reaction products, (3) contacting said treated oil, at a temperature between 80° and 100° F., with between about 4 and 10 lbs./bbl. of said distillate of aqueous sulfuric acid of a strength between about 93 and 100%, for a time between about 5 and 30 minutes, (4) separating an oil from the acid sludge formed in step (3), (5) cycling said acid sludge from step (4) to step (1) for use therein, and (6) treating said oil from step (4) to remove therefrom residual acid and acid sludge.

17. The process of claim 16 wherein said step (6) comprises washing said oil with an aqueous caustic solution.

JACK H. KRAUSE.

No references cited.